US012676934B2

(12) United States Patent
Fujiki et al.

(10) Patent No.: US 12,676,934 B2
(45) Date of Patent: Jul. 7, 2026

(54) INFORMATION PROCESSING DEVICE

(71) Applicant: TOYOTA JIDOSHA KABUSHIKI KAISHA, Toyota (JP)

(72) Inventors: Takeshi Fujiki, Tokyo (JP); Keiko Nakano, Kawasaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 293 days.

(21) Appl. No.: 18/398,407

(22) Filed: Dec. 28, 2023

(65) Prior Publication Data

US 2024/0244140 A1     Jul. 18, 2024

(30) Foreign Application Priority Data

Jan. 13, 2023     (JP) ................................. 2023-003923

(51) Int. Cl.
*H04M 3/523*     (2006.01)
*H04W 4/40*     (2018.01)
(52) U.S. Cl.
CPC ........... *H04M 3/5235* (2013.01); *H04W 4/40* (2018.02)
(58) Field of Classification Search
CPC .............................. H04M 3/5235; H04W 4/40
See application file for complete search history.

(56) References Cited

U.S. PATENT DOCUMENTS

| | | | |
|---|---|---|---|
| 10,637,991 B1* | 4/2020 | Chan | H04M 3/42068 |
| 2007/0116239 A1* | 5/2007 | Jacobi | H04M 7/003 |
| | | | 379/265.02 |
| 2020/0226855 A1* | 7/2020 | Liu | G07C 5/0808 |
| 2020/0272949 A1* | 8/2020 | Chen | G06Q 10/06315 |
| 2021/0156701 A1 | 5/2021 | Suzuki | |

FOREIGN PATENT DOCUMENTS

| | | |
|---|---|---|
| JP | 2017-123608 | 7/2017 |
| JP | 2021-083037 | 5/2021 |
| JP | 2021-083060 A | 5/2021 |

* cited by examiner

*Primary Examiner* — Ariel A Balaoing
(74) *Attorney, Agent, or Firm* — SoraIP, Inc.

(57)     ABSTRACT

An information processing device includes a control unit configured to: receive information indicating that a specific user is requesting a start of a telephone conversation with an operator, and specific information including at least one of information on details of an interaction between the specific user and a specific device before the specific user requests the telephone conversation and information on a status of a specific vehicle before the specific user requests the start of the telephone conversation; presume details of the telephone conversation desired by the specific user based on the specific information; determine, among a plurality of operators, a specific operator associated with the presumed details of the telephone conversation; and connect a first device for the specific user to make the telephone conversation with the specific operator and a second device for the specific operator to make the telephone conversation with the specific user.

4 Claims, 4 Drawing Sheets

FIG. 3

VEHICLE INFORMATION

| COMMUNICATION DEVICE ID | DATE AND TIME | INTERACTION | VEHICLE CONDITIONS |
|---|---|---|---|
| *** | *** | *** | *** |
| | ⋮ | ⋮ | ⋮ |
| | *** | *** | *** |

FIG. 4

RECORD INFORMATION

| COMMUNICATION DEVICE ID | INTERACTION | VEHICLE CONDITIONS | CALL DETAILS |
|---|---|---|---|
| *** | *** | *** | *** |
| ⋮ | ⋮ | ⋮ | ⋮ |
| *** | *** | *** | *** |

FIG. 5

OPERATOR INFORMATION

| OPERATOR ID | CALL DETAILS | CONNECTION DESTINATION |
|---|---|---|
| *** | *** | *** |
| ⋮ | ⋮ | ⋮ |
| *** | *** | *** |

FIG. 6

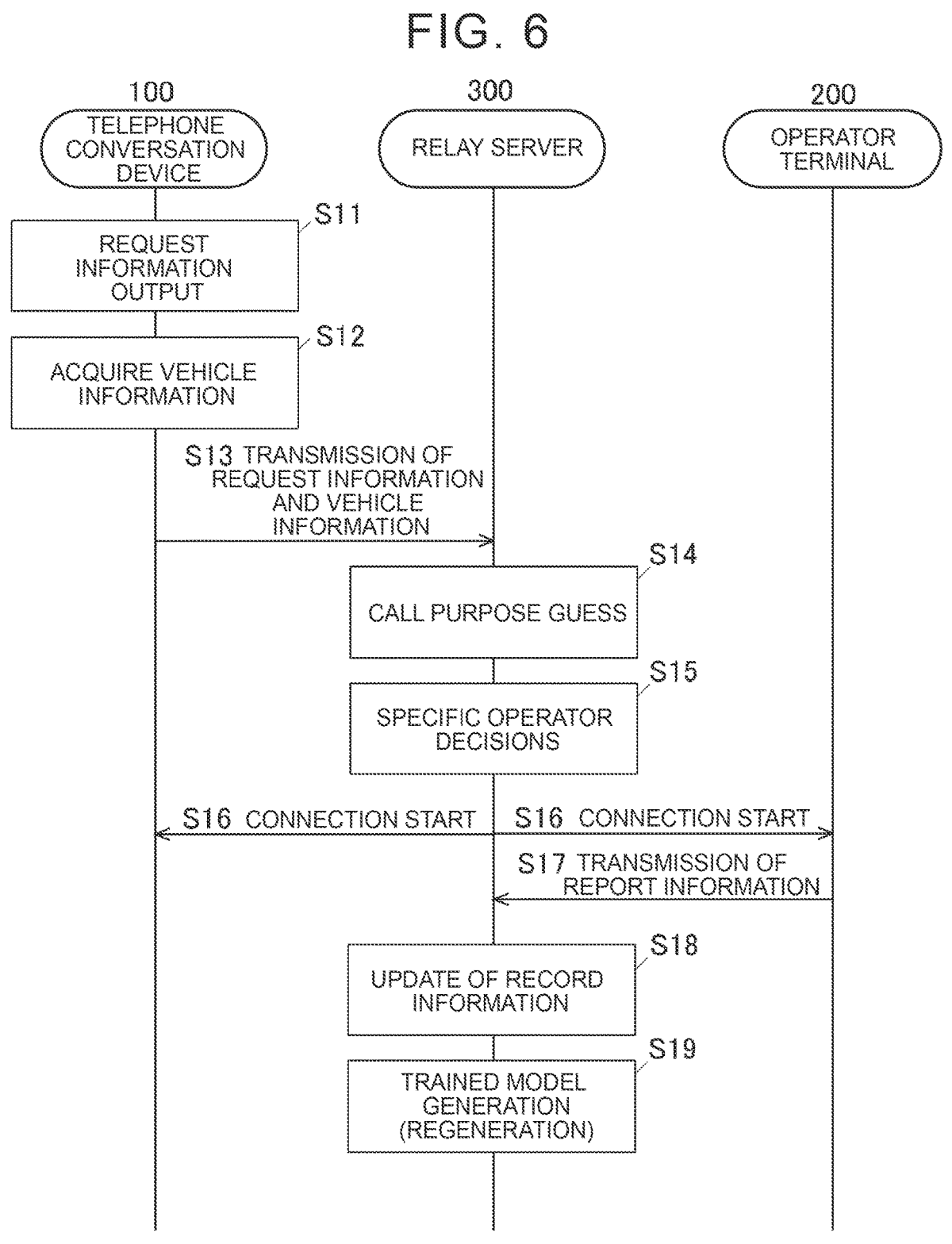

100
TELEPHONE
CONVERSATION
DEVICE

300
RELAY SERVER

200
OPERATOR
TERMINAL

S11
REQUEST
INFORMATION
OUTPUT

S12
ACQUIRE VEHICLE
INFORMATION

S13 TRANSMISSION OF
REQUEST INFORMATION
AND VEHICLE
INFORMATION

S14
CALL PURPOSE GUESS

S15
SPECIFIC OPERATOR
DECISIONS

S16  CONNECTION START          S16  CONNECTION START

S17  TRANSMISSION OF
REPORT INFORMATION

S18
UPDATE OF RECORD
INFORMATION

S19
TRAINED MODEL
GENERATION
(REGENERATION)

INFORMATION PROCESSING DEVICE

CROSS-REFERENCE TO RELATED APPLICATION

This application claims priority to Japanese Patent Application No. 2023-003923 filed on Jan. 13, 2023, incorporated herein by reference in its entirety.

BACKGROUND

1. Technical Field

The present disclosure relates to an information processing device.

2. Description of Related Art

Japanese Unexamined Patent Application Publication No. 2021-083060 (JP 2021-083060 A) discloses an information processing device that manages a communication line for a telephone conversation between a user who is driving a vehicle and an operator who makes a telephone conversation with the user. The information processing device disclosed in JP 2021-083060 A executes a predetermined determination process for determining whether a predetermined condition for determining that the user has lost his/her way is satisfied when a current position of the vehicle is within a predetermined range from a destination of the user. When determination is made that the predetermined condition is satisfied in the predetermined determination process, the information processing device notifies the operator to give route guidance by a telephone conversation with the user.

SUMMARY

An object of the present disclosure is to improve the quality of guidance for a user.

An information processing device according to the present disclosure includes a control unit configured to: receive information indicating that a specific user in a specific vehicle is requesting a start of a telephone conversation with an operator, and specific information including at least one of information on details of an interaction between the specific user and a specific device mounted on the specific vehicle before the specific user requests the telephone conversation and information on a status of the specific vehicle before the specific user requests the start of the telephone conversation; presume details of the telephone conversation desired by the specific user based on the specific information; determine, among a plurality of operators, a specific operator associated with the presumed details of the telephone conversation; and connect a first device for the specific user to make the telephone conversation with the specific operator and a second device for the specific operator to make the telephone conversation with the specific user.

According to the present disclosure, it is possible to improve the quality of guidance for the user.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 3 is a diagram illustrating an example of a table configuration of vehicle information held in a vehicle information database;

FIG. 4 is a diagram illustrating an example of a table configuration of the track record information held in the track record information database;

FIG. 5 is a diagram illustrating an exemplary table configuration of operator information held in an operator information database; and FIG. 6 is a sequence diagram illustrating a flow of information processing in the telephone conversation system.

DETAILED DESCRIPTION OF EMBODIMENTS

Figure 1:
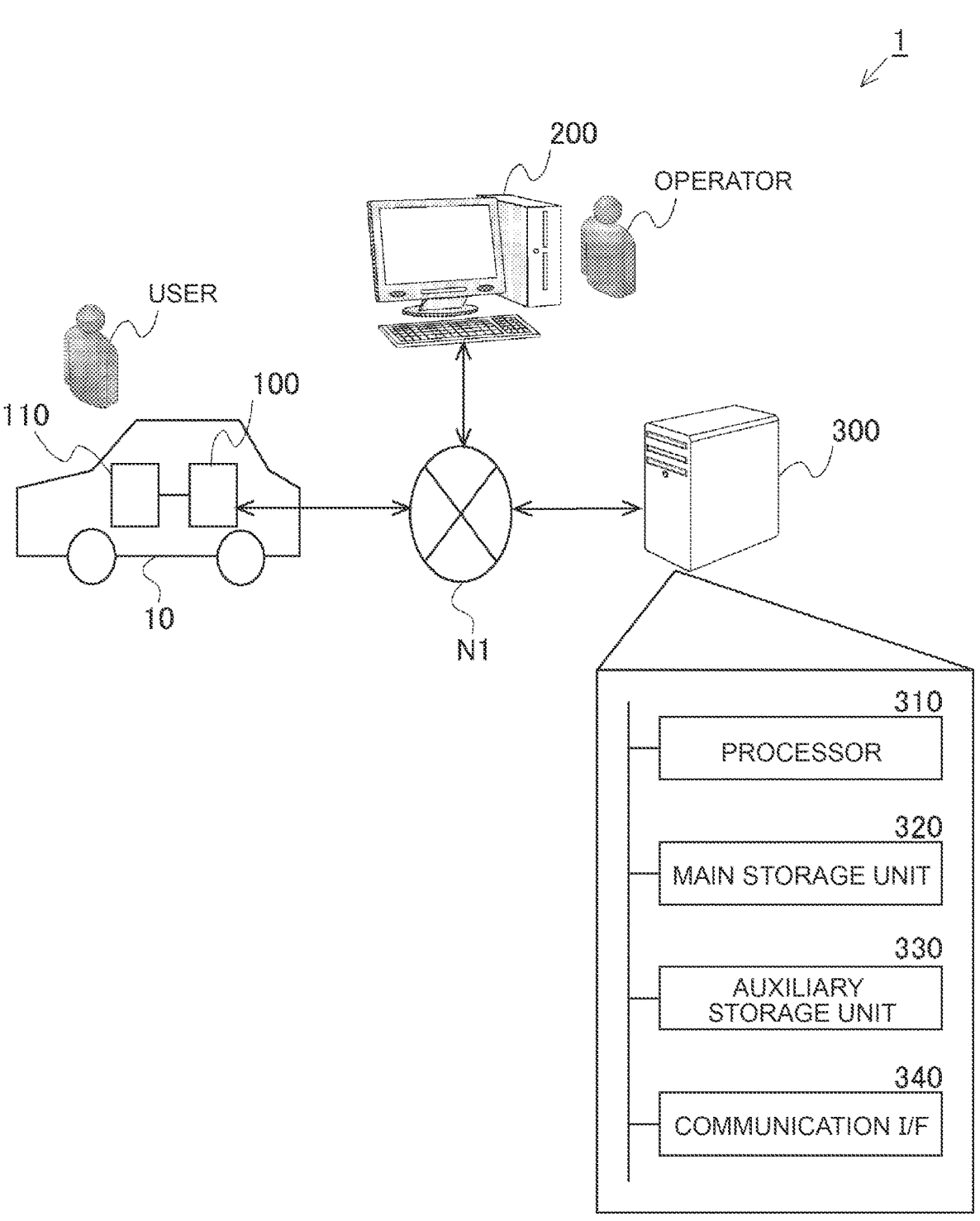
FIG. 1 is a diagram illustrating a schematic configuration of a telephone conversation system.

Assume a case where a specific user on a specific vehicle is trying to start a call with an operator. Further, it is assumed that an operator who makes a call with a specific user among a plurality of operators is randomly selected. If the operator is selected randomly, an operator who is not familiar with the content of the call desired by the specific user among the plurality of operators may make a call with the specific user. As a result, it may not be possible to guide appropriate information to a specific user. An information processing device according to the present disclosure solves such a problem.

The control unit of the information processing device according to the present disclosure receives information indicating that the specific user is requesting the start of a call with the operator. Here, it is assumed that an interaction occurs between a specific user and a predetermined device before the specific user requests to start a call with an operator. Therefore, it is assumed that the information processing device can estimate the content of a call desired by the user by grasping the interaction that has occurred between the specific user and the predetermined apparatus. Further, it is assumed that the specific vehicle is in a predetermined state before the specific user requests the start of a call with the operator. Therefore, it is assumed that the information processing device can estimate the content of the call desired by the user by grasping the situation of the specific vehicle.

Therefore, the control unit of the information processing device according to the present disclosure receives the specific information including at least one of the information about the content of the interaction generated between the specific user and the specific device mounted on the specific vehicle before the specific user makes a call request and the information about the situation of the specific vehicle before the specific user makes a call start request.

The control unit estimates the content of the call desired by the specific user based on the acquired specific information. The control unit determines a specific operator associated with the content of the estimated call from a plurality of operators. Thus, the control unit can determine an operator who is familiar with the content of the call as a specific operator. Then, the control unit starts the connection between the first device and the second device. Here, the first device is a device for a specific user to make a call with an operator. The second device is a device for the specific operator to make a call with the specific user.

As described above, the information processing device enables the specific user to make a call with the specific operator determined based on the specific information when the specific user needs to make a call with the operator. This allows a particular user to talk to a particular operator who is familiar with the content of the desired call. As a result, the quality of the guidance to the user can be improved.

Hereinafter, embodiments of the present disclosure will be described below with reference to the drawings. Unless otherwise specified, dimensions, materials, shapes, relative arrangements, and the like of components described in the present embodiments are not intended to limit the technical scope of the present disclosure to those alone.

Embodiment

System Overview

The telephone conversation system 1 according to the present embodiment will be described with reference to FIG. 1. FIG. 1 is a diagram illustrating a schematic configuration of a telephone conversation system 1. The telephone conversation system 1 includes a telephone conversation device 100, an in-vehicle device 110, an operator terminal 200, and a relay server 300. In the telephone conversation system 1, a telephone conversation device 100, an operator terminal 200, and a relay server 300 are connected to each other via a network N1. The network N1 may be, for example, a worldwide public communication network such as Internet or the like, and a WAN (Wide Area Network) or a telecommunications network such as a cellular network. The vehicle 10 and the telephone conversation device 100 are connected to each other via an in-vehicle network.

Call Device

The telephone conversation device 100 is a device mounted on the vehicle 10. The telephone conversation device 100 is a device for a user to make a call with an operator. While the user is traveling by the vehicle 10, the user may talk to the operator and attempt to receive guidance. A user may, for example, attempt to receive guidance about a route to a destination through a call with an operator. In addition, for example, the user may attempt to receive guidance regarding an in-vehicle device mounted on the vehicle 10 or an operation method of the vehicle 10 through a call with an operator. At this time, the user operates the telephone conversation device 100 to make a call with the operator.

In-Vehicle Device

The in-vehicle device 110 is a device mounted on the vehicle 10. The in-vehicle device 110 is configured to include any device mounted on the vehicle 10. In the present embodiment, the in-vehicle device 110 includes a car navigation system. Further, in the present embodiment, the in-vehicle device 110 includes an electronic control unit that controls the travel of the vehicle 10.

Operator Terminal

The operator terminal 200 is a device for an operator to talk to a user. The operator makes a call with the user using the operator terminal 200 in response to a request for a call from the user, and performs various guidance. Note that there is a plurality of operators who performs the business of providing guidance to the user. That is, the telephone conversation system 1 includes a plurality of operator terminals 200 used by the respective operators.

Relay Server

The relay server 300 is a device that relays a call between a user and an operator. Specifically, the relay server 300 determines, from a plurality of operators, an operator who actually makes a call with the user (hereinafter, sometimes referred to as a "specific operator"). The relay server 300 connects the telephone conversation device 100 and the operator terminal 200 of the specific operator to realize a call between the user and the specific operator.

Here, it is assumed that the relay server 300 randomly selects a specific operator from among a plurality of operators. In this case, among the plurality of operators, there is a possibility that an operator who is not familiar with the contents (contents of the guidance) of a call desired by the user makes a call with the user as a specific operator. As a result, the specific operator may not be able to guide appropriate information to the user. Therefore, the relay server 300 determines a specific operator who is familiar with the content of a desired call from a plurality of operators.

For example, a user may need a call with an operator to receive guidance on how to operate the in-vehicle device 110. In this case, it is assumed that the user operates the in-vehicle device 110 before requesting to start a call with the operator. In addition, the information output by the device that outputs the information desired by the user in the in-vehicle device 110 may not be sufficient. In this case, the user may talk to the operator and seek to receive information. Therefore, it is assumed that the user causes the in-vehicle device 110 to output desired information before requesting to start a call with the operator. In this way, it is assumed that an interaction occurs with the in-vehicle device 110 before the user requests to start a call with the operator.

Therefore, the relay server 300 grasps the content of the interaction that has occurred with the in-vehicle device 110 before the user requests the user to start a call with the operator, so that it is possible to estimate the content of the call that the user desires. Therefore, the relay server 300 acquires the contents of the information output by the in-vehicle device 110 or the operation performed by the in-vehicle device 110 before the user requests the start of a call with the operator. Then, based on the operation on the in-vehicle device 110 or the information output by the in-vehicle device 110, the content of the call desired by the user is estimated.

For example, when the user has operated the car navigation system in the in-vehicle device 110 before requesting the start of the call, the relay server 300 can infer that the user needs to guide the operation method of the car navigation system. Further, when the relay server 300 causes the car navigation system in the in-vehicle device 110 to output the information of the surrounding restaurant before the user requests the start of the call, it can be inferred that the user needs to guide the operator about the information of the surrounding restaurant.

In addition, in a case where the user on the vehicle 10 is outside the living area of the user, it is assumed that a request is made to start a call with an operator in order to receive information such as a surrounding facility or a road condition. In addition, since the user does not know how to operate the vehicle 10, the vehicle 10 may be stopped once. In this case, it is assumed that the user talks with the operator and tries to receive information about the operation method of the vehicle 10. In this way, it is assumed that the vehicle 10 is in a specific state before the user requests the start of a call with the operator. Therefore, the relay server 300 can grasp the situation of the vehicle 10 before the user requests the operator to start a call, thereby estimating the content of the call desired by the user.

Therefore, the relay server 300 determines a specific operator from a plurality of operators based on the vehicle information. Here, the vehicle information is information including information about the content of the interaction generated between the user and the in-vehicle device 110 before the user makes a call request, and information about the situation of the vehicle 10 before the user makes a call start request. Details of a method by which the relay server 300 determines a specific operator from a plurality of operators based on vehicle information will be described later.

The relay server 300 is configured to include a processor 310, a main storage unit 320, an auxiliary storage unit 330, and communication interfaces (computers having communication I/F) 340. The processor 310 is, for example, Central Processing Unit (CPU) or Digital Signal Processor (DSP). The main storage unit 320 is, for example, a Random Access Memory (RAM). The auxiliary storage unit 330 is, for example, a Read Only Memory (ROM). The auxiliary storage unit 330 is, for example, a Hard Disk Drive (HDD), a CD-ROM, DVD disc, or a disc recording medium such as a Blu-ray disc. Further, the auxiliary storage unit 330 may be a portable storage medium (removable medium). Examples of the removable medium include a USB memory or an SD card. The communication I/F 340 is, for example, a Local Area Network (LAN) interface board or wireless communication circuitry for wireless communication.

In the relay server 300, the auxiliary storage unit 330 stores an operating system (OS), various programs, various information tables, and the like. Further, in the relay server 300, the processor 310 loads the program stored in the auxiliary storage unit 330 into the main storage unit 320 and executes the program, thereby realizing various functions as described later. However, some or all of the functions of the relay server 300 may be realized by hardware circuitry such as ASIC or FPGA. The relay server 300 does not necessarily have to be realized by a single physical configuration, and may be constituted by a plurality of computers that cooperate with each other. Note that the telephone conversation device 100, the in-vehicle device 110, and the operator terminal 200 are configured to include a computer in the same manner as the relay server 300.

Functional Configuration

Figure 2:
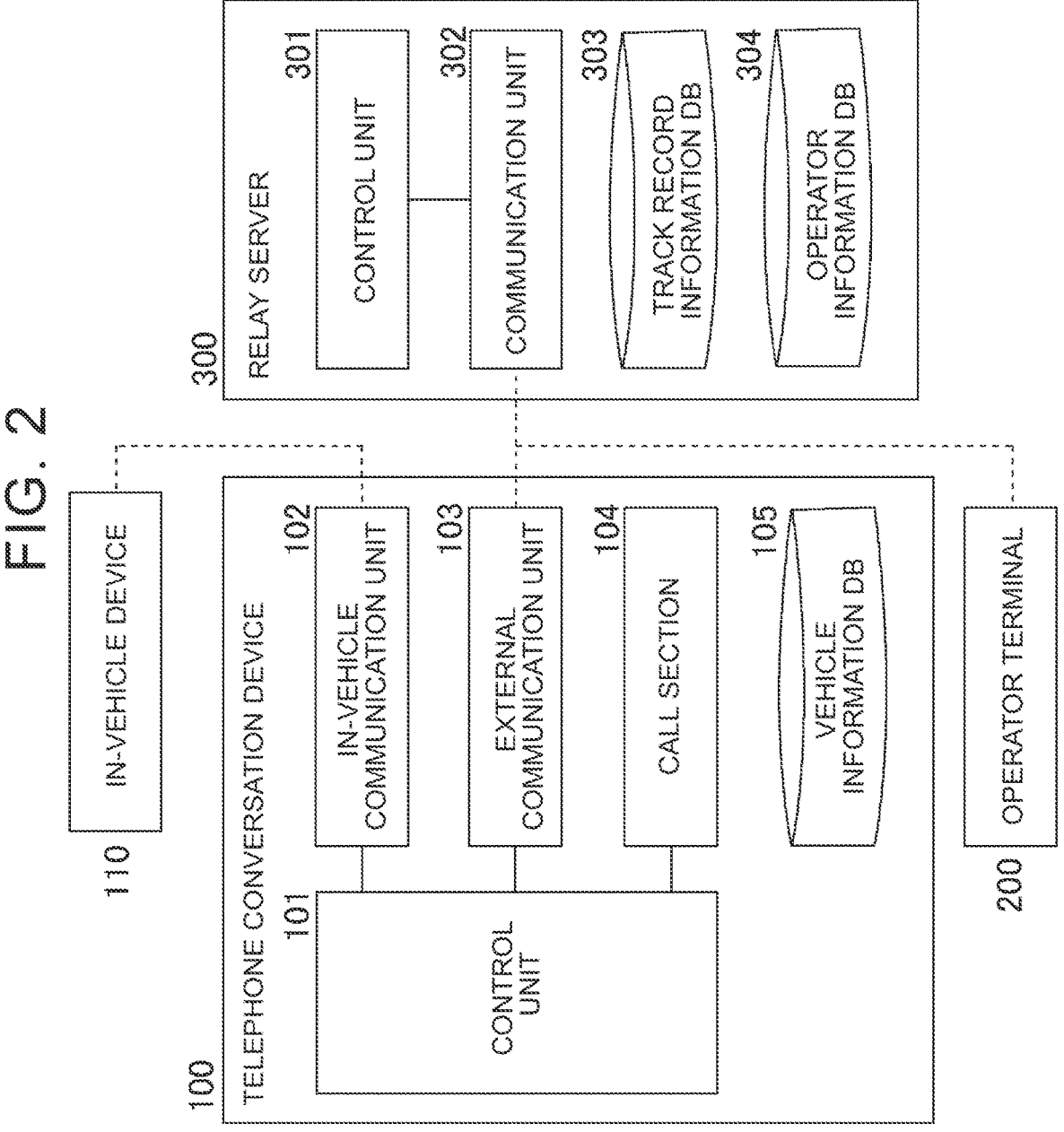
FIG. 2 is a block diagram schematically illustrating an example of a functional configuration of a call device and a relay server.

Next, the functional configuration of each of the telephone conversation device 100 and the relay server 300 constituting the telephone conversation system 1 will be described with reference to FIG. 2 to FIG. 6. FIG. 2 is a block diagram schematically illustrating an example of a functional configuration of the telephone conversation device 100 and the relay server 300.

Call Device

The telephone conversation device 100 includes a control unit 101, an in-vehicle communication unit 102, an out-of-vehicle communication unit 103, a telephone conversation unit 104, and a vehicle information database 105 (vehicle information DB 105). The control unit 101 has a function of performing arithmetic processing for controlling the telephone conversation device 100. The control unit 101 can be implemented by a processor in the telephone conversation device 100. The in-vehicle communication unit 102 has a function of connecting the telephone conversation device 100 to the in-vehicle network of the vehicle 10. The in-vehicle communication unit 102 can be realized by an in-vehicle communication I/F in the telephone conversation device 100. The out-of-vehicle communication unit 103 has a function of connecting the telephone conversation device 100 to a network N1. The in-vehicle communication unit 102 can be realized by an out-of-vehicle communication I/F in the telephone conversation device 100. The telephone conversation unit 104 has a function of enabling a call between a user and an operator.

The telephone conversation unit 104 can be realized by a speakerphone in the telephone conversation device 100. A speakerphone is a device that includes a microphone for audio input and a speaker for audio output. When the telephone conversation unit 104 receives an operation for starting a call with the operator from the user, the control unit 101 outputs request information indicating that the user is requesting the start of a call with the operator. The control unit 101 transmits the request information to the relay server 300 via the out-of-vehicle communication unit 103. The request information includes an address of the telephone conversation device 100 required when the relay server 300 starts a connection between the telephone conversation device 100 and the operator terminal 200.

The control unit 101 receives information indicating an interaction between the in-vehicle device 110 and the user from the in-vehicle device 110 via the in-vehicle communication unit 102. Here, the information indicating the interaction occurring between the in-vehicle device 110 and the user includes information about the content of the operation performed by the user on the in-vehicle device 110. In addition, the information indicating the interaction occurring between the in-vehicle device 110 and the user includes information about the content of the information output by the in-vehicle device 110 to the user.

Further, the control unit 101 receives information about the situation of the vehicle 10 from the car navigation system in the in-vehicle device 110 via the in-vehicle communication unit 102. The information about the situation of the vehicle 10 includes information about the current position of the vehicle 10. In addition, in the information about the situation of the vehicle 10, information about whether or not the vehicle 10 is traveling is received from the electronic control unit in the in-vehicle device 110.

The control unit 101 adds information indicating interactions between the in-vehicle device 110 and the user, which are received from the in-vehicle device 110 through the in-vehicle communication unit 102, and information about the status of the vehicle 10, to the vehicle information held in the vehicle information DB 105. Here, the control unit 101 receives information indicating an interaction occurring between the in-vehicle device 110 and the user and information about the situation of the vehicle 10 from the in-vehicle device 110 at a predetermined cycle.

The vehicle information DB 105 has a function of holding vehicle information. The vehicle information includes information about the content of the interaction generated between the user and the in-vehicle device 110 and information about the status of the vehicle. The vehicle-information DB 105 can be realized by the secondary storage unit in the telephone conversation device 100. FIG. 3 is a diagram illustrating an exemplary table configuration of vehicle information held in the vehicle information DB 105.

As illustrated in FIG. 3, the vehicle information includes a call device ID field, a date and time field, an interaction field, and a vehicle status field. In the call device ID field, an identifier (call device ID) for identifying the telephone conversation device 100 is stored. In the date and time field, information specifying the date and time is stored. In the interaction field, information indicating the content of the interaction that has occurred between the in-vehicle device 110 and the user at the date and time corresponding to the date and time field is stored. In the vehicle status field, information about the status of the vehicle 10 at the date and time corresponding to the date and time field is stored.

The control unit 101 transmits the vehicle information together with the request information to the relay server 300 via the out-of-vehicle communication unit 103. Here, the control unit 101 transmits, to the relay server 300, vehicle information in a predetermined period before the time point when the telephone conversation unit 104 receives an operation for a call with the operator from the user. That is, the control unit 101 transmits the information stored in the interaction field and the vehicle status field in a predetermined time period to the relay server 300 based on the vehicle information held in the vehicle information DB 105. As a result, the relay server 300 can grasp the contents of the interaction that has occurred between the in-vehicle device 110 and the user before the user requests the start of the call with the operator, and the situation of the vehicle 10.

Relay Server

The relay server 300 is configured to include a control unit 301, a communication unit 302, a track record information database 303 (track record information DB 303), and an operator information database 304 (operator information DB 304).

The control unit 301 has a function of performing arithmetic processing for controlling the relay server 300. The control unit 301 can be realized by the processor 310 in the relay server 300. The communication unit 302 has a function of connecting the telephone conversation device 100 to a network N1. The communication unit 302 can be realized by a communication I/F 340 in the relay server 300.

The control unit 301 receives the vehicle information together with the request information from the telephone conversation device 100 via the communication unit 302. The control unit 301 estimates the content of a call desired by the user based on the trained model and the vehicle information. The control unit 301 may infer, for example, a category of a content of a call desired by the user. The control unit 301 inputs the vehicle information to the trained model, and acquires, as an output, the content of the call estimated to be desired by the user. Here, the trained model is a model in which the relationship between the contents of the interaction corresponding to the plurality of users, the situation of the vehicle corresponding to the plurality of users, and the contents of the subsequent call is learned. The content of the interaction corresponding to the plurality of users is the content of the interaction generated between the plurality of users and the in-vehicle device mounted on the vehicle of the plurality of users before the plurality of users request the start of the call with the operator. The situation of the vehicle corresponding to the plurality of users is the situation of the vehicles of the plurality of users before the plurality of users request the start of the call with the operator. Here, the control unit 301 generates a trained model based on the track record information stored in the track record information DB 303.

FIG. 4 is a diagram illustrating an exemplary table configuration of record information held in the track record information DB 303. The track record information DB 303 has a function of holding track record information. The track record information DB 303 can be realized by the auxiliary storage unit 330 in the relay server 300. The record information is information about a relationship between the content of the interaction corresponding to the plurality of users, the situation of the vehicle corresponding to the plurality of users, and the content of the call desired by the plurality of users performed thereafter.

As shown in FIG. 4, the record information includes a call device ID field, an interaction field, a vehicular status field, and a call content field. The call device ID field stores an identifier (call device ID) for identifying a call device mounted on the vehicles of the respective users. In the interaction field, the content of an interaction that occurs between the user and the in-vehicle device mounted on the vehicle of the user is stored prior to the user of the call device corresponding to the call device ID requesting the initiation of the call with the operator. In the vehicle status field, information about the status of the vehicle prior to the user of the call device corresponding to the call device ID requesting initiation of a call with the operator is stored. In the call content field, the user of the call device corresponding to the call device ID actually talks with the operator. In the call content field, for example, information about the category of the content actually talked to the operator by the user of the call device corresponding to the call device ID is stored.

The control unit 301 receives vehicle-information from the telephone conversation device 100 through the communication unit 302 at a timing when a call is requested from the telephone conversation device 100 corresponding to the call device ID. Further, the control unit 301 receives, from the operator terminal 200, information about the content of an actual call made between the user of the call device corresponding to the call device ID and the operator through the communication unit 302 at a timing at which the call is terminated. Then, the control unit 301 stores, in the call content field, information about the content of the actual call received from the operator terminal 200 in the call content field.

As illustrated in FIG. 4, the record information is information on a relationship between the contents of the interaction corresponding to the plurality of users, the situation of the vehicle corresponding to the plurality of users, and the contents of the subsequent communication with the plurality of users. Therefore, the control unit 301 can generate a trained model based on the record information. Any method can be adopted as a method by which the control unit 301 generates a trained model based on the record information.

The control unit 301 specifies a specified operator from a plurality of operators based on the content of the call desired by the user estimated based on the vehicle information and the trained model and the operator information held in the operator information DB 304. The operator information DB 304 is realized by the auxiliary storage unit 330 in the relay server 300. FIG. 5 is a diagram illustrating an exemplary table configuration of operator information held in the operator information DB 304.

As illustrated in FIG. 5, the operator data includes an operator ID field, a call content field, and a destination field. An identifier (operator ID) for identifying an operator is stored in the operator ID field. In the call content field, information indicating the content (call content) of the call associated with the operator corresponding to the operator ID is stored. In the call content field, information indicating the content (category) of the call (guidance) in which the operator corresponding to the operator ID has knowledge of a predetermined level or higher may be inputted. In the call content field, information is stored by an input by an administrator or the like of a plurality of operators. The connection destination field includes an address of the operator terminal 200 required when the relay server 300 starts a connection between the telephone conversation device 100 and the operator terminal 200.

The control unit 301 determines the specified operator based on the content of the call that the user has estimated to desire and the operator information held in the operator information DB 304. Specifically, the control unit 301 determines, as a specific operator, an operator in which the category of the content of the call estimated to be desired by the user matches the category of the content of the call stored in the content of the call field in the operator information. At this time, when there is a plurality of operators in which the content of the call estimated to be desired by the user matches the content of the call stored in the call content field in the operator information, the specific operator may be determined at random from these operators.

The control unit 301 starts connection of a call between the telephone conversation device 100 and the operator terminal 200 based on the address of the telephone conversation device 100 included in the request information and the address of the operator terminal 200 of the specific operator stored in the connection destination field of the operator information. Thus, the user and the specific operator can make a call.

The control unit 301 receives report information from the operator terminal 200 via the communication unit 302. Here, the report information is information including information indicating the content of an actual call performed between the user and the specific operator. The control unit 301 updates the track record information held in the track record information DB 303. Specifically, the control unit 301 acquires information about the content of the interaction between the user and the in-vehicle device 110 included in the vehicle information and information about the vehicle state of the vehicle 10. The control unit 301 stores these pieces of information in the interaction field and the vehicle status field in the record information. In addition, the control unit 301 stores, in the call content field in the record information, information indicating the content of the actual call performed between the user and the specific operator, which is included in the report information.

The control unit 301 generates (regenerates) a trained model based on the updated track record information. Accordingly, the trained model can be generated based on the latest track record information. As a result, a trained model with higher accuracy can be generated, and the content of a call desired by the user can be estimated with high accuracy.

Flow of Information Processing

Next, a flow of information processing in the telephone conversation system 1 will be described with reference to FIG. 6. FIG. 6 is a sequence diagram illustrating a flow of information processing in the telephone conversation system 1. The respective processes executed by the telephone conversation device 100, the operator terminal 200, and the relay server 300 are executed by the control unit 101, the control unit of the operator terminal 200, and the control unit 301, respectively.

In the telephone conversation system 1, first, the telephone conversation device 100 outputs a request (S11). In addition, the telephone conversation device 100 acquires the vehicle information from the vehicle information DB 105 (S12). Then, the telephone conversation device 100 transmits the request information and the vehicle information to the relay server 300 (S13).

The relay server 300 estimates a content of a call desired by the user on the basis of the vehicle information and the trained model (S14). Next, the relay server 300 determines a particular operator based on the content of the call that the user has estimated to desire and the operator information held in the operator information DB 304 (S15). Then, the relay server 300 starts connecting the telephone conversation device 100 and the operator terminal 200 (S16). As a result, communication for a call between the telephone conversation device 100 and the operator terminal 200 becomes possible, and the user and the specific operator can make a call.

The operator terminal 200 transmits the report information to the relay server 300 (S17). Here, the specific operator inputs information on the content (category) of the call to the operator terminal 200 during the call with the user or after the end of the call, and the operator terminal 200 generates report information based on the information. Then, the operator terminal 200 transmits the report information to the relay server 300.

The relay server 300 updates the record information based on the vehicle information received from the telephone conversation device 100 and the report information received from the operator terminal 200 (S18). Then, the relay server 300 generates (regenerates) a trained model based on the updated track record information. Note that the relay server 300 does not need to generate the trained model immediately after the update of the track record information. The relay server 300 may generate the trained model at a predetermined timing. Here, the predetermined timing is, for example, a predetermined timing. Further, the predetermined timing may be, for example, a timing at which the administrator of the relay server 300 causes the regeneration of the trained model to be executed. Further, the predetermined timing may be, for example, a timing at which the update of the record information is performed a predetermined number of times.

As described above, the telephone conversation system 1 allows the user to make a call with a specific operator when the user needs to make a call with the operator. This allows the user to talk to a specific operator who is familiar with the content of the desired call. As a result, the quality of the guidance to the user can be improved.

First Modification

In the present embodiment, the vehicle information is information including information indicating the content of an interaction that has occurred between the user and the in-vehicle device 110 before the user makes a call request, and information indicating the situation of the vehicle 10 before the user makes a call start request. However, the vehicle information may be information including only one of the two pieces of information. In this case, the relay server 300 infers the content of the call desired by the user on the basis of a trained model in which the relationship between either one of the content of the interaction corresponding to the plurality of users and the status of the vehicle corresponding to the plurality of users and the content of the call with the plurality of users performed thereafter is learned. Even in this manner, the relay server 300 can determine a specific operator, and the quality of guidance to the user can be improved.

Second Modification

In the present embodiment, the information about the situation of the vehicle 10 includes information about the current position of the vehicle 10. Further, the information about the situation of the vehicle 10 includes information about whether or not the vehicle 10 is traveling. However, the information about the situation of the vehicle 10 may include information other than the two pieces of information. Here, the user may be a user who has a short usage history of the vehicle 10. In this case, it is assumed that the user wishes to make a call in order to receive guidance on how to use the vehicle 10. Therefore, the information about the situation of the vehicle 10 may include information about the usage history of the vehicle 10 by the user.

Third Modification

In the present embodiment, the relay server 300 estimates the content of a call desired by the user based on the trained model. However, the relay server 300 does not necessarily have to infer the content of the call desired by the user based on the trained model. When a predetermined interaction occurs between the user and the in-vehicle device 110 in the vehicle information, the relay server 300 may infer that the user desires the content of the predetermined call. Further, when information indicating that the situation of the vehicle 10 is a predetermined situation is included, the relay server 300 may infer that the user desires the content of the predetermined call. For example, when the vehicle information includes information indicating that the in-vehicle device 110 is operating the car navigation system, the relay server 300 estimates that the user wants to guide the operation method of the car navigation system. Further, for example, in the case where the vehicle 10 is stopped in the vehicle information, the relay server 300 estimates that the user desires to guide information about the surrounding facility. Even in this manner, the relay server 300 can determine a specific operator, and the quality of guidance to the user can be improved.

Other Embodiments

The above-described embodiments are mere examples, and the present disclosure can be implemented with appropriate modifications within a range not departing from the scope thereof. Moreover, the processes and units described in the present disclosure can be freely combined and implemented unless technical contradiction occurs.

Further, the processes described as being executed by one device may be shared and executed by a plurality of devices. Alternatively, the processes described as being executed by different devices may be executed by one device. In the computer system, it is possible to flexibly change the hardware configuration (server configuration) for realizing each function.

The present disclosure can also be implemented by supplying a computer with a computer program that implements the functions described in the above embodiment, and causing one or more processors of the computer to read and execute the program. Such a computer program may be provided to the computer by a non-transitory computer-readable storage medium connectable to the system bus of the computer, or may be provided to the computer via a network. Examples of the non-transitory computer-readable storage medium include a random disk (such as a magnetic disk (a floppy (registered trademark) disk an HDD, and the like) or an optical disc (such as a CD-ROM, a DVD disc, and a Blu-ray disc)), a ROM, a RAM, an EPROM, an EEPROM, a magnetic card, a flash memory, an optical card, and a random type of medium suitable for storing electronic instructions.

What is claimed is:

1. An information processing device comprising:
a control unit configured to
receive information indicating that a specific user in a specific vehicle is requesting a start of a telephone conversation with an operator, and specific information including at least one of information on details of an interaction between the specific user and a specific device mounted on the specific vehicle before the specific user requests the telephone conversation and information on a status of the specific vehicle before the specific user requests the start of the telephone conversation;
presume details of the telephone conversation desired by the specific user based on the specific information;
determine, among a plurality of operators, a specific operator associated with the presumed details of the telephone conversation; and
connect a first device for the specific user to make the telephone conversation with the specific operator and a second device for the specific operator to make the telephone conversation with the specific user, wherein
the control unit is configured to presume the details of the telephone conversation desired by the specific user based on the specific information and a trained model that has been trained about relationships between at least one of details of interactions between a plurality of users and devices mounted on vehicles of the users before the users request a start of telephone conversations with the operators and statuses of the vehicles of the users before the users request the start of the telephone conversations with the operators, and details of the telephone conversations that have been made afterwards.

2. The information processing device according to claim 1, further comprising:
a storage unit configured to store record information indicating relationships between at least one of the details of the interactions associated with the users and the statuses of the vehicles associated with the users and the details of the actual telephone conversations that have been made by the users, wherein the control unit is further configured to
update the record information based on at least one of the details of the interaction associated with the specific user and the status of the specific vehicle associated with the specific user, and the details of the actual telephone conversation that has been made between the specific user and the specific operator; and
generate the trained model based on the updated record information.

3. The information processing device according to claim 1, wherein
the information on the details of the interaction between the specific user and the specific device includes at least one of information on an operation performed by the specific user on the specific device and information on details of information output by the specific device to the specific user.

4. The information processing device according to claim 1, wherein
the information on the status of the specific vehicle includes at least one of information on a current position of the specific vehicle, information on whether the specific vehicle is traveling, and information on a history of use of the specific vehicle by the specific user.

* * * * *